United States Patent

Morikawa

[15] 3,696,108

[45] Oct. 3, 1972

[54] PRODUCTION OF ISOPRENE DIMERS

[72] Inventor: Hiroyuki Morikawa, Ibaraki, Japan

[73] Assignee: Mitsubishi Petrochemical Company Limited, Tokyo-to, Japan

[22] Filed: Nov. 23, 1970

[21] Appl. No.: 92,221

[30] Foreign Application Priority Data

Dec. 24, 1969    Japan ..................44/104018

[52] U.S. Cl..............................260/677 R, 260/666 B
[51] Int. Cl..............................C07c 3/10, C07c 11/02
[58] Field of Search................260/680 B, 677, 666 B

[56] References Cited

UNITED STATES PATENTS

| | | |
|---|---|---|
| 3,179,580 | 4/1965 | Fukui et al..................204/162 |
| 3,149,173 | 9/1964 | Wittenberg................260/666 |
| 3,277,099 | 11/1966 | Seibt et al..................260/666 |

Primary Examiner—Delbert E. Gantz
Assistant Examiner—J. Nelson
Attorney—Robert E. Burns and Emmanuel J. Lobato

[57] ABSTRACT

Isoprene is dimerized by being caused to contact a catalyst which is a combination of: (I) a titanium compound (e.g., titanium tetrachloride); (II) a phosphorus or antimony compound constituting an electron-donor compound (e.g., triphenyl phosphite); and (III) an aluminum compound (e.g., diethylaluminum chloride). Titanium compound (I) is representable by the general formula $TiX_nY_{4-n}$ or $TiOX_2$, where each of X and Y is a halogen, an OR'' group, an acetylacetonato group, or a chlorosulfonyl group, and $n$ is an integer of 1 to 4, both inclusive. Phosphorous or antimony compound (II) is representable by the general formuls $P(OR)_3$, $PO(OR)_3$, or $Sb(OR)_3$. Aluminum compound (III) is representable by the general formulas $AlR'_2Cl$ or $Al_2R'_3Cl_3$. Each of R, R', and R'' is an alkyl, cycloalkyl, alkenyl, or aryl group.

5 Claims, No Drawings

PRODUCTION OF ISOPRENE DIMERS

BACKGROUND OF THE INVENTION

This invention relates generally to isoprene dimers and production thereof. More particularly, the invention relates to a new and advanced process for selectively producing linear dimers of isoprene.

It is well known that butadiene can be selectively dimerized through the use of a catalyst comprising a compound of a transition metal and an organoaluminum compound.

In the case of isoprene, however, the selectivities and yield of oligomers thereof are low, and effective dimerization thereof has not yet been realized. It appears that isoprene readily undergoes oligomerization and cyclic trimerization, and there is at least one report of formation of cyclic trimers of isoprene with a titanium complex catalyst (as disclosed in Japanese Pat. Publication Nos. 2372/1960 and 6170/1961).

SUMMARY OF THE INVENTION

It is an object of the present invention to produce linear isoprene dimers having highly useful characteristics. I have discovered that such isoprene dimers can be selectively produced by using, as a catalyst, a combination of a titanium complex catalyst and a specific electron-donor compound.

According to the present invention, more specifically summarized, there is provided a process for producing isoprene dimers wherein isoprene is dimerized by being caused to contact a catalyst comprising, in combination: (I) at least one titanium compound representable by the general formula $TiX_nY_{4-}$ or $TiOX_2$, where each of X and Y is a halogen, an OR'' group (wherein R'' is an alkyl group, a cycloalkyl group, an alkenyl group, or an aryl group), an acetylacetonato group, or a chlorosulfonyl group, and $n$ is an integer from 1 to 4, both inclusive; (II) at least one phosphorus or antimony compound represented by the general formula $P(OR)_3$, $PO(OR)_3$, or $Sb(OR)_3$, where R is an alkyl group, a cyclo-alkyl group, an alkenyl group, or an aryl group); and (III) is an aluminum compound represented by the general formula $Al\ R'_2Cl$ or $Al_2R'_3Cl\ 3$, where R' is an alkyl, cycloalkyl, alkenyl, or aryl group which is the same as or different from the above mentioned R.

The nature, principle, and utility of the invention will be more clearly apparent from the following detailed description beginning with general aspects of the invention and concluding with specific examples illustrating preferred embodiments of the invention.

DETAILED DESCRIPTION

As mentioned briefly hereinbefore, the present invention provides a process wherein isoprene dimers are produced by combining specific electron-donor compounds with titanium complex catalysts, and wherein, moreover, the structural characteristic of the substance formed can be controlled by the kind of electron-donor compound used.

These highly advantageous features of the invention could not anticipated by the aforementioned prior art. These features are the result of the reaction which is uniquely characteristic of isoprene, the trimer becoming the predominant formed substance in the case of butadiene or pentadiene, whereby the formation of linear dimers cannot be detected. Reference is made to copending application, Ser. No. 24214 filed on Mar. 31, 1970, entitled "OPEN-CHAIN OLIGOMERS AND PRODUCTION OF THE SAME."

One component of the catalyst suitable for use in the invention is a titanium compound (I) defined by the aforementioned general equation. Representative examples of the halogen are chlorine, bromine, and iodine. Representative examples of the OR'' group are alkoxy groups (particularly lower alkoxy groups) having a carbon number of the order of from 1 to 10 and aryloxy groups (particularly phenoxy groups). Examples of specific compounds are as follows:

titanium tetrachloride
titanium tetrabromide
titanium tributoxychloride
titanium dibutoxychloride
titanium butoxytrichloride
titanium tetraphenoxide
titanium tetraethoxide
titanium acetylacetonatotrichloride
titanium diacetylacetonatotrichloride
titanium chlorosulfonyltrichloride
titanium dibutoxydiacetylacetonato
titanyl dichloride
titanyl dibromide
titanyl dibutoxide
titanyl diacetylacetonato For the second component, which is the electron-donor compound (II), compounds in each of which R is an alkyl group (particularly a lower alkyl group) or an aryl group (particularly a phenyl or tolyl group) of a carbon number of the order of from 1 to 10 are representative. Examples of specific compounds are as follows.

1. Phosphorous ester derivatives, $P(OR)_3$:
    trimethyl phosphite
    triethyl phosphite
    tripropyl phosphite
    tributyl phosphite
    triphenyl phosphite
    tricresyl phosphite 2. Phosphoric ester derivatives, $PO(OR)_3$:
    trimethyl phosphate
    triethyl phosphate
    tributyl phosphate
    triphenyl phosphate
    tricresyl phosphate 3. Antimony compounds, $Sb(OR)_3$:
    antimony triethoxide
    antimony tributoxide
    antimony triphenoxide Representative examples of aluminum compounds (III) are those in which R' is an alkyl group (particularly a lower alkyl group) or an aryl group (particularly a phenyl group) of a carbon number of the order of from 1 to 10. Examples of specific compounds are as follows.

dimethylaluminum chloride
diethylaluminum chloride
dipropylaluminum chloride
dibutylaluminum chloride
diphenylaluminum chloride
ethylaluminum sesquichloride
isobutylaluminum sesquichloride The catalyst according to the invention is formed by mixing together the above described three indispensable components (each of which may be a mixture of substances). While this mixture may be carried out at one time or in stages, the preferable procedure, in general, is to cause the titanium compound and the phosphorus compound (or the antimony compound) to contact first and then to add thereto the aluminum compound. This mixing is preferably carried out in a hydrocarbon solvent and in an atmosphere in which active impurities which become catalyst poisons are not present as, for example, an atmosphere of an inert gas.

The mol ratios of these three essential components are, in general, as follows. Phosphorus (or antimony) compound/titanium compound is from (0.3 : 1) to (2 : 1), particularly from (0.5 : 1) to (1.5 : 1). Aluminum compound/titanium compound is from (1 : 1) to (50 : 1), particularly from (3 : 1) to (10 : 1).

Except for the use of a catalyst of the above described character, the present invention can be practiced by any suitable mode of practice which can be applied to oligomerization reaction of this kind.

Accordingly, the process of the invention may be carried out by causing an isoprene to contact a catalyst as described above in the presence of a suitable solvent as, for example, a hydrocarbon (such as benzene, toluene, xylene, hexane, and heptane) (a reaction without a solvent also being possible), at a temperature of the order of from 0° to 100° c, particularly of the order of from 30° to 80° C, and under a pressure of the order of from atmospheric pressure to a pressure thereabove. It is possible to use for the isoprene an isoprene containing a small quantity of another 1,3-diene.

Upon completion of the reaction, the solvent used is removed, and the process materials are subjected further to fractional distillation, whereupon the objective dimer and some trimer are recovered.

While the following isoprene dimers and trimers may be formed, 2,6-dimethyl-1,3,6-octatriene is obtained with the highest yield.

Dimers:
  2,6-dimethyl-1,3,6-octatriene
  3,6-dimethyl-1,3,6-octatriene
  2,4-dimethyl-4-vinyl-1-cyclohexene Trimers:
  2,4-dimethyl-4-(4-methyl-1, 4-hexadienyl)-1-cyclohexene trimethyl cyclododecatriene As is known, isoprene dimers are important starting materials in organic synthesis. Linear dimers, which are the predominant formed substances, particularly have monoterpene skeletons, and derivatives of alcohols and aldehydes thereof can be utilized as terpene synthetic perfumes.

In order to indicate still more fully the nature and utility of the invention, the follow specific examples of practice constituting preferred embodiments of the invention are set forth. It is to be understood that these examples are presented as illustrative only, and that they are not intended to limit the scope of the invention. All percentages are by weight throughout this disclosure.

EXAMPLE 1.

A pressure reaction tube of 150 cc capacity is flushed with nitrogen, and 30 cc of benzene, 1 millimole of titanium tetrachloride, and 1 millimole of triphenyl phosphite are placed therein. Then 4 millimoles of diethylaluminum chloride and 10 grams (g) of isoprene are added to the process materials.

The resulting mixture is then agitated at 40° C for 5 hours. Thereafter, a methanol hydrochloric acid solution is added to the mixture to decompose the catalyst, and, after concentration of the solvent, the resulting process materials are subjected to reduced-pressure distillation, whereupon 8.1g of an oligomer fraction (boiling point 45 to 130° C/7 to 8mm Hg), the oligomer yield being 81 percent, is obtained.

The chemical composition of the oligomer fraction thus obtained is as follows.

63 percent 2,6-dimethyl-1,3,6-octatriene; 2 percent 3,6-dimethyl-1,3,6-octatriene; 23 percent 2,4-dimethyl-4-vinyl-1-cyclohexene; and 12 percent trimers.

EXAMPLE 2.

30 cc of benzene, 1 millimole of titanium dibutoxy dichloride, 1 millimole of tributyl phosphite, 3 millimoles of diethylaluminum chloride, and 20g of isoprene are used as starting materials and subjected to the process set forth in Example 1.

As a result, 16.6g (yield of 83 percent) of an oligomer fraction is obtained. The composition of this fraction is as follows.

66 percent 2,6-dimethyl-1,3,6-octatriene; 3 percent 3,6-dimethyl-1,3,6-octatriene; 21 percent 2,4-dimethyl-4-vinyl-1-cyclohexene; and 10 percent trimers.

EXAMPLE 3.

30 cc of toluene, 1 millimole of titanium tetraphenoxide, 1.2 millimoles of tricresyl phosphite, 8 millimoles of diethylaluminum chloride, and 10g of isoprene are used as starting materials in a reaction at 60° C for 5 hours and subjected to the procedure specified in Example 1.

As a result, 7.3g (yield of 73 percent) of an oligomer fraction is obtained. The composition of this fraction is as follows.

54 percent 2,6-dimethyl-1,3,6-octatriene; 2 percent 3,6-dimethyl-1,3,6-octatriene; 41 percent 2,4-dimethyl-4-vinyl-1-cyclohexene; and 3 percent trimers.

EXAMPLE 4

30 cc of benzene, 1 millimole of titanyl dichloride, 1 millimole of triphenyl phosphite, 4 millimoles of diisobutylaluminum chloride, and 10g of isoprene are used as starring materials and processed in accordance with Example 1.

As a result, 8.2g (yield of 82 percent) of an oligomer fraction is obtained. The composition of this fraction is as follows.

63 percent 2,6-dimethyl-1,3,6-octatriene; 32 percent, 2,4-dimethyl-4-vinyl-1-cyclohexene; and 5 percent trimers.

EXAMPLE 5.

30 cc of benzene, 1 millimole of titanyl dibromide, 1 millimole of triphenyl phosphite, 5 millimoles of diethylaluminum chloride, and 10g of isoprene are used as starting materials and subjected to the process specified in Example 1.

As a result, 6.5g (yield of 65 percent) of an oligomer fraction is obtained. The composition of this fraction is as follows.

51 percent, 2,6-dimethyl-1,3,6-octatriene; 43 percent 2,4-dimethyl-4-vinyl-1-cyclohexene; and 6 percent trimers.

EXAMPLE 6.

30 cc of benzene, 1 millimole of titanyl diacetylacetonate, 1.5 millimoles of triphenyl phosphite, 6 millimoles of diethylaluminum choride, and 20g of isoprene are caused to react at 60° C for 5 hours and subjected to the process specified in Example 1.

As a result, 17.8g (yield of 89 percent) of an oligomer fraction is obtained. The composition of this fraction is as follows.

50 percent 2,6-dimethyl-1,3,6-octatriene; 3 percent 3,4-dimethyl-1,3,6-octatriene; 37 percent 2,4-dimethyl-4-vinyl-1-cyclohexene; and 10 percent trimers.

EXAMPLE 7.

30 cc of benzene, 1 millimole of titanium diacetylacetonate dichloride, 1 millimole of triphenyl phosphite, 4 millimoles of diethylaluminum chloride, and 10g of isoprene are caused to react for 5 hours at 60° C and processed in accordance with Example 1.

As a result, 8.2g (yield of 82 percent) of an oligomer fraction is obtained. The composition of this fraction is as follows.

52 percent 2,6-dimethyl-1,3,6-octatriene; 2 percent 3,6-dimethyl-1,3,6-octatriene; 38 percent 2,4-dimethyl-4-vinyl-1-cyclohexene; and 8 percent trimers.

EXAMPLE 8.

40 cc of benzene, 1 millimole of titanyl diacetyl acetonate, 1 millimole of triphenyl phosphate ester, 6 millimoles of diethylaluminum chloride, and 10g of isoprene are used as starting materials and subjected to the process of Example 1.

As a result, 7.3g (yield of 73 percent) of an oligomer fraction is obtained. This fraction has the following composition.

46 percent 2,6-dimethyl-1,3,6-octatriene; 27 percent 2,4-dimethyl-4vinyl-1-cyclohexene; and 27 percent trimers.

EXAMPLE 9.

30 cc of heptane, 1 millimole of titanium acetylacetonato trichloride, 1 millimole of triethyl phosphate ester, 4 millimoles of diethylaluminum chloride, and 10g of isoprene are used and subjected to the process of Example 1.

As a result, 7.4g (yield of 74 percent) of an oligomer fraction of the following composition is obtained.

47 percent 2,6-dimethyl-1,3,6-octatriene; 25 percent 2,4-dimethyl-4vinyl-1-cyclohexene; and 28 percent trimers.

EXAMPLE 10.

30 cc of heptane, 1 millimole of titanium diacetylacetonato dibutoxide, 1.3 millimoles of triphenyl phosphite, 2.5 millimoles of ethylaluminum sesquichloride, and 10g of isoprene are used as starting materials and processed by the procedure of Example 1.

As a result, 6.6g (yield of 65 percent) of an oligomer fraction of the following composition is obtained.

57 percent 2,6-dimethyl-1,3,6-octatriene; 2 percent 3,6-dimethyl-1,3,6-octatriene; 44 percent 2,4-dimethyl-4-vinyl-1-cyclohexene; and 7 percent trimers.

EXAMPLE 11.

30 cc of benzene, 1 millimole of titanium tetraethoxide, 1.3 millimoles of triethyl phosphite, 5 millimoles of ethylaluminum sesquichloride, and 10g of isoprene are used as starting materials and subjected to the process of Example.

As a result, 6.1g yield of 61 percent) of an oligomer fraction of the following composition is obtained.

50 percent 2,6-dimethyl-1,3,6-octatriene; 1 percent 3,6-dimethyl-1,3,6-octatriene; 41 percent 2,4-dimethyl-4-vinyl-1-cyclohexene, and 8 percent trimers.

EXAMPLE 12.

30 cc of benzene, 1 millimole of titanyl dibutoxide, 1 millimole of triphenyl phosphite, 6 millimoles of diisobutylaluminum chloride, and 20g of isoprene are used as starting materials and subjected to the process of Example 1.

As a result, 15g (yield of 75 percent) of an oligomer fraction of the following composition is obtained.

56 percent 2,6-dimethyl-1,3,6-octatriene; 3 percent 3,6-dimethyl-1,3,6-octatriene; 35 percent 2,4-dimethyl-4-vinyl-1-cyclohexene; and 6 percent trimers.

EXAMPLE 13.

30 cc of benzene 1 millimole of titanium butoxytrichloride, 1 millimole of antimony tributoxide, 4 millimoles of diethylaluminum chloride, and 10g of isoprene are used as starting materials and subjected to the process of Example 1.

As a result, 6.3g (yield of 63 percent) of an oligomer fraction of the following composition is obtained.

56 percent 2,6-dimethyl-1,3,6-octatriene; 2 percent 3,6-dimethyl-1,3,6-octatriene; 39 percent 2,4-dimethyl-4-vinyl-1-cyclohexene; and 3 percent trimers.

EXAMPLE 14.

30 cc of benzene, 1 millimole of titanium tetrabromide, 0.8 millimole of trimethyl phosphite, 5 millimoles of diethylaluminum chloride, and 10g of isoprene are used as starting materials and subjected to the process of Example 1.

As a result, 6.2g (yield of 62 percent) of an oligomer fraction of the following composition is obtained.

55 percent 2,6-dimethyl-1,3,6-octatriene; 37 percent 2,4-dimethyl-4vinyl-1-cyclohexene; and 8 percent trimers.

EXAMPLE 15.

30 cc of benzene, 1 millimole of titanium chlorosufonyltrichloride, 1 millimole of triphenyl phosphite 4 millimoles of diethylaluminum chloride, and 20g of isoprene are used as starting materials and subjected to the process of Example 1.

As a result, 17.6g (yield of 86 percent) of an oligomer fraction of the following composition is obtained.

58 percent 2,6-dimethyl-1,3,6-octatriene; 41 percent 2,4-dimethyl-4vinyl-1-cyclohexene; and 1 percent trimers.

In order to indicate the effectiveness of the electron-donors $P(OR)_3$, $PO(OR)_3$, and $Sb(OR)_3$ used in the catalyst system according to the invention, the following Reference Example, in which results obtained with these components are compared with those obtained without addition of these components, is set forth.

Reaction conditions:
1. $AlEt_2Cl — TiCl_4$ system, 40° C, 5 hrs.
2. $AlEt_2Cl — TiCl_3 (OBu)$ system, 40° C, 5 hrs.

It is apparent from the results of this comparison that the electron-donor compounds as used in accordance with the invention have the effect not only of increasing the oligomer yield but also of accomplishing structural regulation.

I claim:

1. A process for producing isoprene dimers which comprises causing isoprene to dimerize by contacting a catalyst comprising, in combination:
   I. at least one member selected from the group consisting of titanium compounds represented by the formulas $TiX_nY_{4-n}$, wherein each of X and Y is a member selected from the group consisting of halogens, the acetylacetonato group, chlorosulfonyl group and OR'' groups, in which R'' is a member selected from the group consisting of alkyl, cycloalkyl, alkenyl, and aryl, and n is an integer from 1 to 4, inclusive;
   II. at least one member selected from the group consisting of phosphorus compounds and antimony compounds represented by the formulas $(P(OR)_3$ $PO(OR)_3$ and $Sb(OR)_3$ wherein R is a member selected from the group consisting of alkyl, cycloalkyl, alkenyl, and aryl groups; and
   III. at least one member selected from the group consisting of aluminum compounds represented by the formulas $AlR'_2Cl$ and $Al_2R'_3Cl_3$, wherein R' is a member selected from the group consisting of alkyl, cycloalkyl, alkenyl, and aryl.

2. A process for producing isoprene dimers according to claim 1 in which the mole ratio of the phosphorous compound or antimony compound to the titanium compound is from 0.3 : 1 to 2 : 1, preferably from 0.5 : 1 to 1.5 : 1, and the mole ratio of the aluminum compound to the titanium compound is from 1 : 1 to 50 : 1.

3. A process for producing isoprene dimers according to claim 1 in which: said halogen is selected from the group consisting of chlorine, bromine, and iodine; said OR'' group is a member selected from the group consisting of alkoxy groups, and aryloxy groups, of a carbon number of the order of from 1 to 10; and the carbon number of each of R and R' is of the order of from 1 to 10.

4. A process according to claim 2 in which said mole ratio of aluminum compound to titanium compound is from 3 : 1 to 10 : 1.

5. A process according to claim 3 in which said alkoxy group is a lower alkoxy group and said aryloxy group is a phenoxy group.

* * * * *